United States Patent
Wah et al.

(10) Patent No.: US 6,754,203 B2
(45) Date of Patent: Jun. 22, 2004

(54) METHOD AND PROGRAM PRODUCT FOR ORGANIZING DATA INTO PACKETS

(75) Inventors: Benjamin Wan-Sang Wah, Champaign, IL (US); Dong Lin, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 79 days.

(21) Appl. No.: 10/100,543

(22) Filed: Mar. 18, 2002

(65) Prior Publication Data

US 2003/0099236 A1 May 29, 2003

Related U.S. Application Data

(60) Provisional application No. 60/333,597, filed on Nov. 27, 2001.

(51) Int. Cl.[7] .............................................. H04L 12/56
(52) U.S. Cl. ........................ 370/352; 370/353; 370/516
(58) Field of Search ................................ 370/352, 353, 370/389, 394, 516; 704/219, 222, 223, 252

(56) References Cited

U.S. PATENT DOCUMENTS

| | | | | |
|---|---|---|---|---|
| 4,630,262 A | * | 12/1986 | Callens et al. ............... | 370/435 |
| 4,907,277 A | | 3/1990 | Callens et al. | |
| 5,696,873 A | * | 12/1997 | Bartkowiak ................. | 704/216 |
| 5,732,389 A | * | 3/1998 | Kroon et al. ................ | 704/223 |
| 5,768,527 A | | 6/1998 | Zhu et al. | |
| 5,774,836 A | * | 6/1998 | Bartkowiak et al. ........ | 704/207 |
| 5,864,795 A | * | 1/1999 | Bartkowiak ................. | 704/216 |
| 5,883,893 A | * | 3/1999 | Rumer et al. ............. | 370/395.6 |
| 5,928,331 A | | 7/1999 | Bushmitch | |
| 5,937,374 A | * | 8/1999 | Bartkowiak et al. ........ | 704/209 |
| 6,079,042 A | | 6/2000 | Vaman et al. | |
| 6,104,998 A | * | 8/2000 | Galand et al. .............. | 704/500 |
| 6,141,341 A | | 10/2000 | Jones et al. | |
| 6,163,868 A | | 12/2000 | Kondo et al. | |
| 6,175,871 B1 | | 1/2001 | Schuster et al. | |
| 6,215,787 B1 | | 4/2001 | Kovacevic et al. | |
| 6,356,545 B1 | * | 3/2002 | Vargo et al. ................. | 370/355 |
| 6,389,006 B1 | * | 5/2002 | Bialik ......................... | 370/352 |

OTHER PUBLICATIONS

R. Aravind, M.R. Civanlar, and A.R. Reibman, "Packet loss resilience of MPEG–2 scalable video coding algorithms", *IEEE Trans. on Circuits and Systems for Video Technology*, 6(5): 426–435, Oct. 1995.

(List continued on next page.)

*Primary Examiner*—Wellington Chin
*Assistant Examiner*—William Schultz
(74) *Attorney, Agent, or Firm*—Greer, Burns & Crain, Ltd.

(57) ABSTRACT

A method for communicating data over a packet switched network comprises dividing data into a plurality of frames, with each frame described by at least a first and a second parameter. The second parameter has a high correlation. The first parameter is placed in a first and a second description, while the second parameter is interleaved to the first and second descriptions. The first and second descriptions are packetized and communicated over the network. Upon reception, the first parameters for a frame sequence are extracted from one of the packets, while the interleaved second parameters are extracted from both the packets. If a packet is lost, the missing first parameter may be obtained from another packet, while the missing second parameter may be reconstructed using a second parameter from the other packet.

32 Claims, 7 Drawing Sheets

OTHER PUBLICATIONS

K. Cluver and P. Noll, Reconstruction of missing speech frames using sub-band excitation, Proc. *IEEE-SP Int'l Symposium on Time-Frequency and Time-Scale Analysis*, pp. 277–280, Jun. 1996.

R.V. Cox and P. Kroon, "Low bit-rate speech coders for multimedia communication", *IEEE Communication Magazine*, 34(12):34–41, Dec. 1996.

M. Ghanbari, "Two-layer coding of video signals for VBR networks", *IEEE journal on Selected Areas in Communications*, 7:801–806, Jun. 1989.

V. Hardman, M.A. Sasse, M. Handley, A. Watson, "Reliable audio for use over the Internet", *International Networking Conf.*, pp. 171–178, Jun. 1995.

N.S. Jayant and S.W. Christensen, "Effects of packet losses in waveform coded speech and improvements due to odd–even sample–interpolation procedure", *IEEE Trans. on Communications*, 29(2):101–110, Feb. 1981.

J.P. Campbell, Jr., T.E. Tremain, and V.C. Welch, "The federal standard 1016 4800 bps CELP voice coder", *Digital Signal Processing*, 1(3):145–155, 1991.

M. Kansari, A. Jalali, E. Dubois, and P. Mermelstein, "Low bit rate video transmission over fading channels for wireless microcellular systems", *IEEE Trans. on Circuits and Systems for Video Technology*, 6:1–11, Feb. 1996.

M. Khansari and M. Vetterli, "Layered transmission of signals over power–constrained wireless channels", *Proc. IEEE International Conf. on Image Processing*, pp. 380–383, Oct. 1995.

M.M. Lara–Barron and G.B. Lockhart, Packet–based embedded encoding for transmission of low–bit–rate–encoded speech in packet networks. *IEE Proc.–1*, 139(5):482–487, Oct. 1992.

G.B. Lockhart and M.M. Lara–Barron, "Implementation of packet–based encoding schemes for speech transmission", *Proc. Sixth Int'l Conf. on Digital Processing of Signals in Communications*, pp. 326–330, 1991.

J. Nonnenmacher, E.W. Biersack, and D. Towsely, "Parity–based loss recovery for reliable multicast transmission", *IEEE/ACM Trans. on Networking*, 6:349–361, Aug. 1998.

K. Ramchandran, A. Ortega, K.M. Uz and M. Vetterli, Multiresolution broadcast for digital HDTV using joint source channel coding, *IEEE journal on Selected Areas in Communications*, 11:6–23, Jan. 1993.

K. Saito, H. Fujiya, H. Kobmura, and S. Kanno, "Voice packet communication system for private networks", *IEEE Global Telecommunications Conf., GLOBECOM '89*, vol. 3, pp. 1874–1878, 1989.

N. Shacham, "Packet recovery and error correction in high–speed wide–area networks", *1989 IEEE Military Communications Conf.*, vol. 2, pp. 551–557, Oct. 1989.

N. Shacham and P. McKenney, "Packet recovery in high–speed networks using coding and buffer management", *Proc. of IEEE INFOCOM*, pp. 124–131, May 1990.

A.C. Smith and J.J.D.V. Schalkwyk, Line–spectrum pairs: a review, *Proc. Southern African Conf. on Communications and Signal Processing*, pp. 7–11, Jun. 1988.

A.S. Spanias, Speech coding: a tutorial review. *Proc. of the IEEE*, vol. 82, pp. 1441–1582, Oct. 1994.

J. Suzuki and M. Taka, Missing packet recovery techniques for low–bit–rate coded speech, *IEEE Journal on Selected Areas in Communications*, 7(5):707–717, Jun. 1989.

J. Tang, "Evaluation of double sided periodic substitution (DSPS) method for recovering missing speech in packet voice communications", *Proc. Tenth Annual Int'l Phoenix Conf. on Computers and Communications*, pp. 454–458, Mar. 1991.

V.A. Vaishampayan, "Design of multiple description scalar quantizer", *IEEE Trans. on Information Theory*, 39(3):821–834, May 1993.

V.A. Vaishampayan and J. Domaszewicz, "Design of entropy constrained multiple description scalar quantizers", *IEEE Trans. on Information Theory*, 40:245–251, Jan. 1994.

O.J. Wasem, D.J. Goodman, C.A. Dvordak, and H.G. Page, "The effect of waveform substitution on the quality of PCM packet communications", *IEEE Trans. on Acoustics, Speech, and Signal Processing*, 36(3):342–348, Mar. 1988.

M. Yong, Study of voice packet reconstruction methods applied to CELP speech coding, *Proc. IEEE Int'l Conf. on Acoustics, Speech and Signal Processing*, vol. 2, pp. 125–128, Mar. 1992.

Y.Q. Zhang, Y.J. Liu, and R.L. Pickholtz, Layered image transmission over cellular radio channels, *IEEE Trans. on Vehicular Technology*, 43:786–796, Aug. 1994.

Q. Zhu, Y. Wang, and L. Shaw, "Coding and cell–loss recovery in DCT–based packet video", *IEEE Trans. on Circuits and Systems for Video Technology*, 3(3):248–258, Jun. 1993.

\* cited by examiner

METHOD AND PROGRAM PRODUCT FOR ORGANIZING DATA INTO PACKETS

CROSS REFERENCE

The present application claims priority under 35 USC 119 of U.S. Provisional Application No. 60/333,597 filed Nov. 27, 2001.

FIELD OF THE INVENTION

The present invention is related to network communications. More particularly, the present invention is related to methods and program products for achieving reduced effects due to packet losses.

BACKGROUND OF THE INVENTION

Packet network communications are often performed using a packet switched protocol, in which data is packaged into discrete packets that are then transmitted individually across the network. Each packet is individually addressed to one or more recipient addresses, and may also include routing instructions for traversing the network. A widely used example of a packet based network communications protocol includes Internet Protocol ("IP"), which may be used for real-time interactive communications, for instance, over the Internet. Because of the widespread and relatively low cost access to the Internet, IP has become a popular protocol for use in a variety of applications.

By way of example, real-time communication of voice, video, and music data over networks is often accomplished in a packet-switched protocol such as IP. Generally, these applications involve coding a temporal stream of real-time input data such as spoken words, music, or a video clip into digital format, packaging into discrete packets, transmission over the network, reception at a receiver site, unpacking, and decoding back to its original voice, video, or music format. Many particular algorithms for accomplishing these tasks are known.

One type of algorithm for coding and decoding speech data is known generally as a linear predictive coding. Linear predictive coding analyzes the input speech data to build a model of the speech. It is advantageous in that it combines relatively high quality performance with low bit rate requirements. Since speech is simply the acoustic wave that is radiated from lips when air is expelled from the lungs, adjusted at the glottis, and passed through the vocal tract, a linear predictor speech coding method decouples vocal-cord vibration or turbulence in the glottis with the frequency shaping effect of the vocal tract. The vocal-cord vibration or turbulence in the glottis is usually referred to as excitation, or residue, whereas the vocal tract is modeled as a linear predictor. Because speech signals vary with time, modeling is done on short chunks of the signal, called frames.

A numerical model is built to model the vocal tract and the residue within each frame. The model itself in linear prediction coding uses a linear prediction analysis to predict each sample as a linear combination of previous samples. Line spectral pairs ("LSPs"), often coded as a vector, are an equivalent representation of the coefficients of the model's linear equation. Speech signals are also characterized by additional parameters that may generally be referred to as excitations. Excitations may be coded in any of a number of formats, with an example being stochastic and adaptive codewords used in Federal Standard 1016 CELP (Code Excited Linear Predictor).

Regardless of the particular algorithm used in packet-based communication to code speech, music, or video data, the decoded data is subject to errors and low quality due to packet loss or delay. Packet loss or delay occurs when packets of data are lost between the transmission point and the reception point, or are delayed such that they arrive beyond the time they are supposed to be used. As used herein, it will be understood that the term "packet loss" refers to both packet loss and delay. Packet loss may be a particularly acute problem on networks with no quality of service guarantee such as the Internet. Packets may be lost in a "random" pattern where individual packets tend to turn up missing, or in a "bursty" pattern where sequences of packets are missing.

In the case of voice, video, and music transmission, packet loss problems are particularly disadvantageous. They can result in what is perceived as a "choppy" or "jumpy" decoded stream to the end user recipient, with pauses, frozen frames, missing frames, and the like encountered. In addition, many coding algorithms utilize temporal differences to achieve coding efficiency, thereby introducing sequential packet-to-packet dependencies into the packets transmitted. Packet losses under such circumstances can be particularly troublesome.

Methods for preventing packet loss and otherwise alleviating packet loss effects have been proposed. For example, highly reliable networks can be developed with relatively low rates of packet loss. Such networks, however, tend to require expensive resources to build and maintain to the extent that they are often not practical, especially in a wireless environment. Other proposed solutions involve introducing redundancies to transmission, wherein data is transmitted multiple times so that if one packet is lost the data may be recovered from a second. Again, however, these solutions may require substantially increased resources in the form of costly additional bandwidth and resources. Priority based methods assign different priorities to different packets, with the highest priority packets given more resources in the network in order to have a higher chance to travel to the destination. Even these high-priority packets are subject to loss and delay, however. Further, these methods require an underlying network protocol having priority level support.

Other proposed methods include those that require some real time cooperation between sender and receiver. If a packet is lost, the receiver notifies the sender so that the packet may be resent. Such schemes may not be useful, however, with real time interactive communications because of the time limitations on data delivery. Also, reliable communications between the receiver and sender are often not available, making such feedback based methods difficult.

Still additional methods for alleviating packet loss/delay problems focus on "concealing" loss by re-constructing missing packets at the receiver. Some of these algorithms use information based on preceding and/or succeeding packets to estimate the contents of the missing packet. Other algorithms fill missing packets with "background" data, with an example being inserting white noise or static, or replaying previously received packets in the case of voice data. Clearly, such practices can be disadvantageous for speech, music, or video as the data in an individual packet does not always flow "smoothly" from the preceding to the succeeding, and is therefore often difficult to accurately reconstruct.

One type of packet loss concealment method is known as multi-description coding ("MDC"). MDC divides data into equally important streams so that either stream may be decoded for acceptable replay of the input data and that more streams will result in higher decoding quality than one stream. A straightforward way to implement MDC is sample-based MDC that relies on strong inter sample correlations. Interleaving is used to distribute adjacent samples (e.g., sequential odd and even) of voice, video, or music data to different packets, as opposed to a sequence of adjacent samples being packaged in the same packet. MDC accordingly results in much smaller "gaps" being left to fill when a packet is lost, with interpolation of samples in packets received that is much more effective. Examples of MDC can be found in U.S. Pat. No. 6,215,787 to Kovacevic et al., U.S. Pat. No. 6,163,868 to Kondo et al., both of which are hereby incorporated by reference.

The use of MDC for LP coding of data, however, has been to date limited and not well refined. Many problems remain unresolved. Experiments performed to investigate the use of traditional sample-based MDC with LP coders for voice, for instance, resulted in poor results. In order to provide multiple descriptions using many MDC methods of the prior art, increased bandwidth was disadvantageously required. As a proposed solution, the sampling rate was decreased so that the bit rate remained constant with the pre-MDC coding scheme. These proposed solutions, however, met with limited success in that resulting speech quality was degraded due to the reduced sampling rate.

Unresolved needs in the art therefore exist.

SUMMARY OF THE INVENTION

The present invention is directed to a method and a program product for organizing data into packets. An embodiment of the present invention comprises the steps of dividing the data into a plurality of frames, with each frame being described by at least a first and a second parameter. The second parameter has a high correlation from parameter to parameter. The first parameter for each of the frames is placed in a first and a second data packet, while the second parameter is interleaved into the first and second data packets.

An additional embodiment of the invention comprises additional steps of communicating the data packets over a packet switched network, receiving the communicated packets, and extracting the first parameter from only one of the first or second packets, and extracting the interleaved second parameters from both of the first and second packets. If one of the first or second packets is discovered to be lost, the first parameters may be replaced using the first parameters from the other of the first or second packets in the sequence. The second parameter may be reconstructed using at least the second parameter from the other packet in the sequence, as the second parameter has a high correlation.

Through embodiments of the invention, then, data such as voice, video, music or the like are communicated in a manner that substantially increases the quality of the data under conditions of lossy networks. Otherwise unresolved problems in the art are thereby solved.

DETAILED DESCRIPTION

Figure 1:
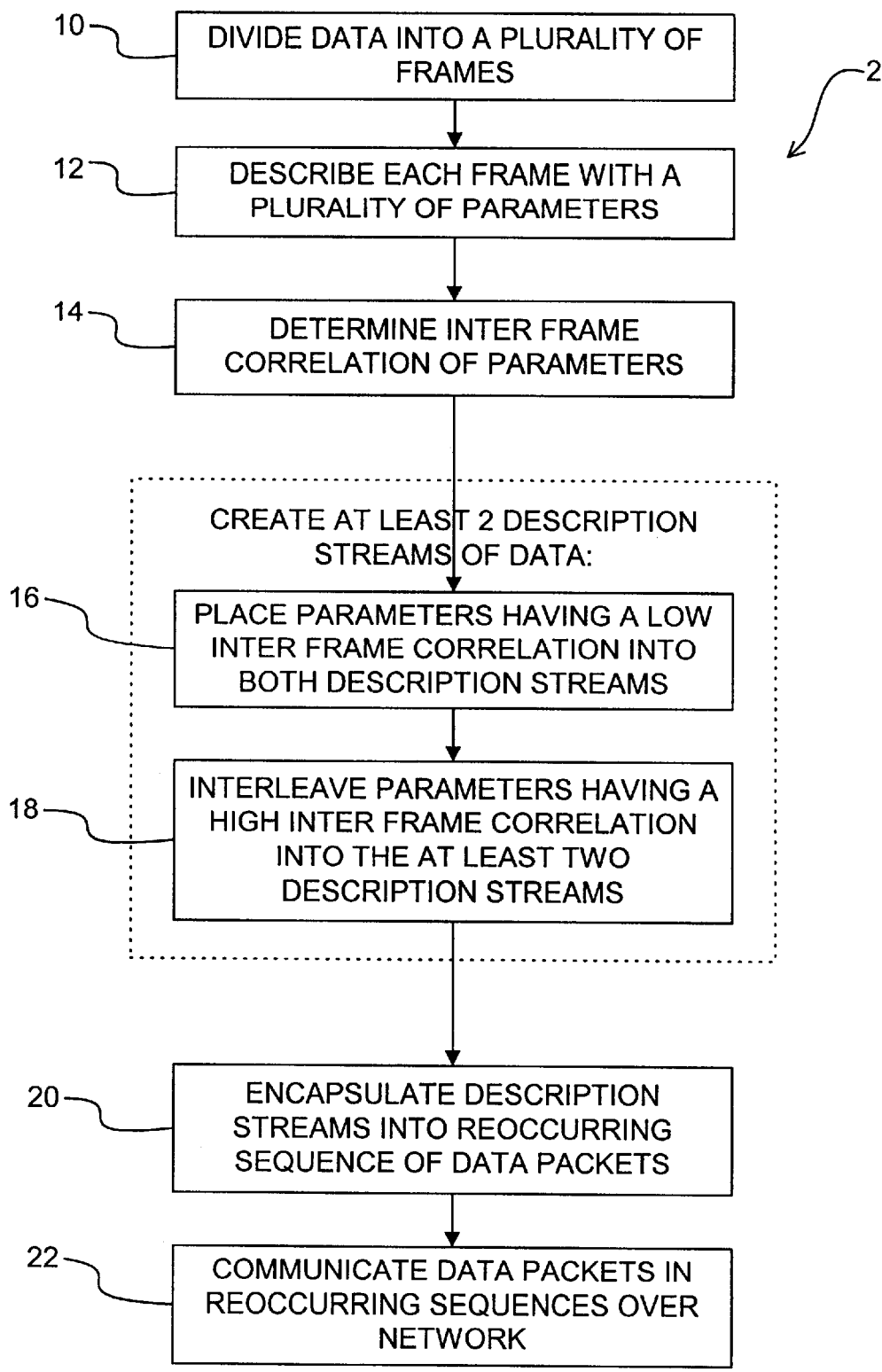
FIG. 1 is a flowchart illustrating steps of an invention embodiment.

In order to illustrate the best known modes of practice of embodiments of the present invention, it will be useful to first describe a general embodiment of a method of the invention. Accordingly, reference is made to the flowchart of FIG. 1 illustrating a method embodiment 2, as well as to the schematic of FIG. 2. An embodiment step comprises dividing input data into a plurality of frames 48 and 50 (block 10). Each frame is described by a plurality of parameters (block 12), illustrated in FIG. 2 as X, Y, and Z. The term "parameter" as used herein is intended to broadly refer to data. The parameters may comprise, by way of example, model coefficients representative of the data in the frames 48 and 50. The method embodiment 2 further comprises a step of determining a correlation for each of the parameters describing the frames 48 and 50 (block 14).

As used herein, the term "correlation" is intended to broadly refer to a measure of the variation of a parameter from parameter to parameter. By way of example, a parameter having a high correlation may generally be thought of as having a relatively close linkage between sequential parameters. Correlations may be determined on an intra or inter frame basis, for example, with an intra frame correlation referring to the correlation between the respective parameters in a particular frame, and an inter frame correlation referring to the correlation between parameters of different frames.

Figure 2:
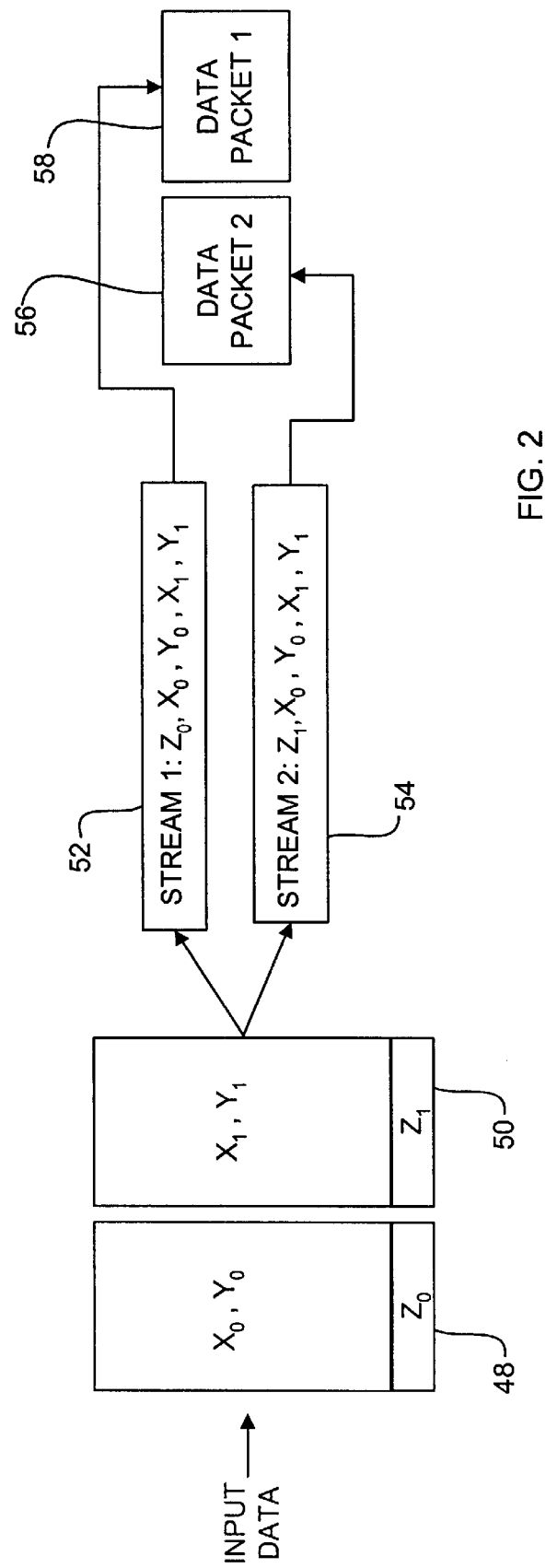
FIG. 2 is a schematic helpful for discussing the embodiment of FIG. 1.

In the embodiment illustrated in FIG. 2, an inter frame correlation is determined. It is noted that it may be useful to consider a plurality of frames that numbers greater than the two illustrated in FIG. 2; indeed it will be appreciated that accurate determination of inter frame correlations will often require a consideration of a multiplicity of frames. Likewise, determination of an intra frame correlation may comprise consideration of a multiplicity of parameters in a frame.

For this reason it may be convenient to perform the step of determining a correlation prior to other method steps. Further, the step of determining a correlation may simply comprise obtaining pre-determined correlations from a lookup table, user input, or other reference. In the method embodiment 2 as applied to the schematic of FIG. 2, the parameter Z has been determined to have a high inter frame correlation, and the parameters X and Y to have a low inter frame correlation.

The method embodiment 2 further comprises creating at least two descriptions 52 and 54 of the frames. In creating the descriptions 52 and 54, the method comprises a step of placing parameters for both frames having a low correlation, which in this embodiment comprises an inter frame correlation, in both descriptions (block 16), and of interleaving parameters having a high inter frame correlation in the two descriptions 52 and 54 (block 18). This results in the description 52 having the $Z_0$ parameter describing the frame 48, in addition to the X and Y parameters that describe both the frames 48 and 50. Likewise, the description 54 contains the $Z_1$ parameter describing the frame 50, as well as all of the X and Y parameters that describe both the frames 48 and 50.

The two descriptions 52 and 54 are then encapsulated in a sequence of data packets 56 and 58 (step 20). The sequence is reoccurring in that subsequent frames from the first and second descriptions will be encapsulated in the same order in subsequent packet sequences. By way of example, parameters from the description 52 may always be encapsulated in even numbered packets, while parameters from the description 54 may always be encapsulated in odd numbered packets. The data packets are then communicated over the packet switched network (block 22).

It will be appreciated that embodiments of the invention will also be useful in manipulating intra-frame correlations. It is noted, however, that the designation of a correlation as "intra" or "inter" frame is somewhat arbitrary in that definition of a frame size will change this designation. That is, an "intra-frame" correlation could conceivably be called an "inter-frame" correlation depending on the definition of a frame size. Accordingly, it will be appreciated that the precise characterization of what kind of correlation (e.g., inter frame or intra frame) is being used in different embodiments of the present invention is not important to the invention.

Figure 3:
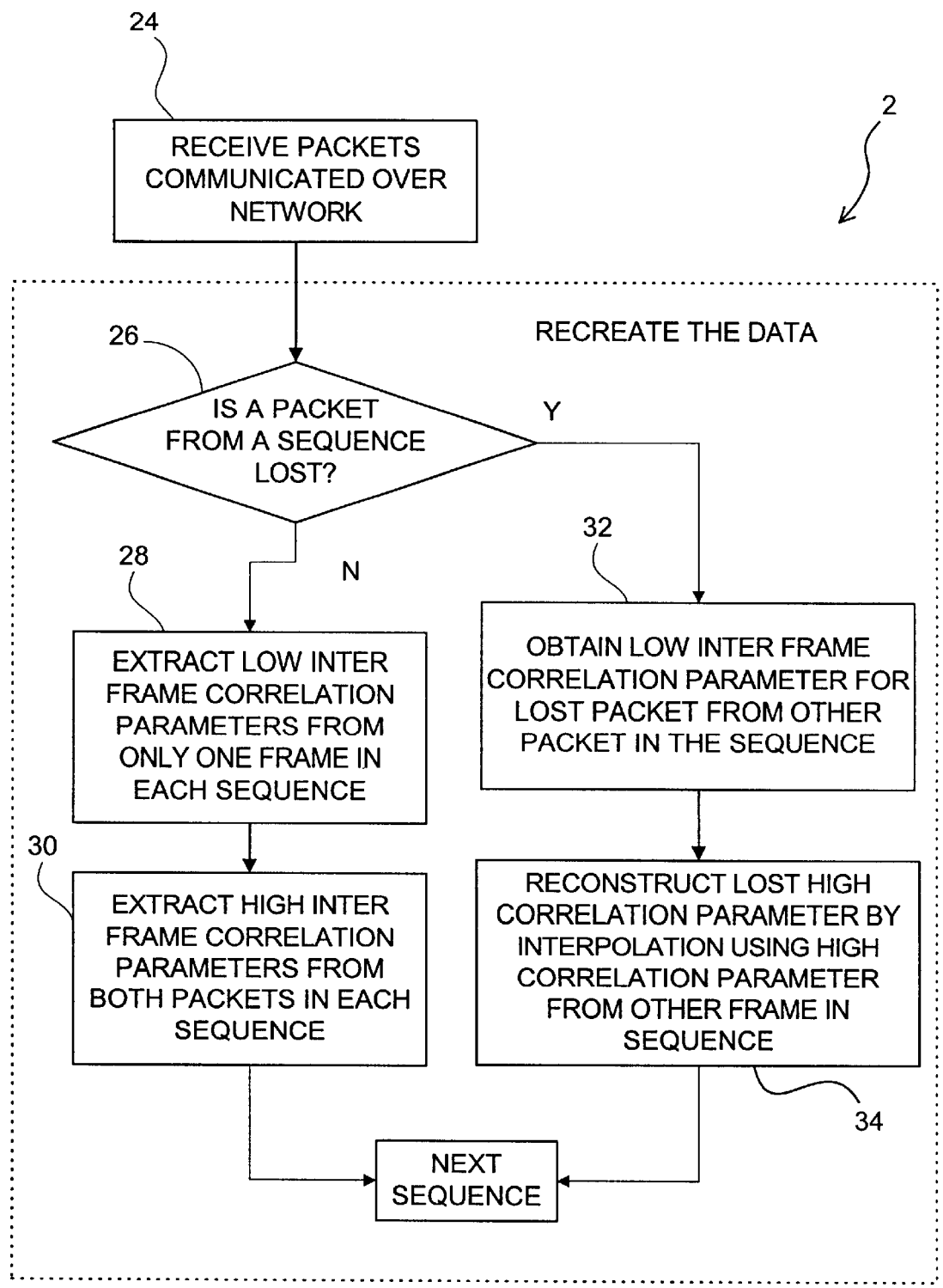
FIG. 3 is a flowchart illustrating steps of an additional invention embodiment.
Figure 4A:
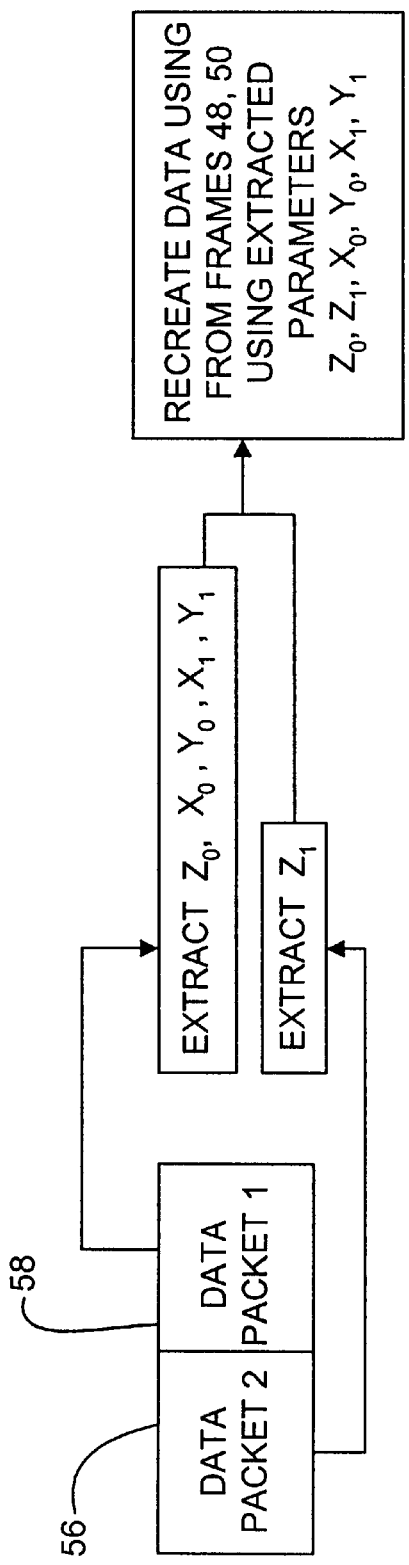
FIGS. 4(a)–(b) are schematics helpful for discussing the embodiment of FIG. 3.

The method embodiment 2 further comprises steps of receiving the packets over the network and of extracting the data from the packets, as generally shown in the flowchart of FIG. 3 and in the schematics of FIG. 4. The packets 56 and 58 are first received (block 24), with the data then re-created from the packets 56 and 58. If it is determined that no packets from a sequence are lost (block 26), the data may be recreated by extracting the low inter frame correlation parameters from only one of the packets 56 or 58 (block 28), and the interleaved parameters extracted from both packets 56 and 58 (block 30). As illustrated by FIG. 4(a), for example, the X and Y parameters are extracted from the packet 58 only, while the interleaved Z parameters are extracted from both data packets 56 and 58. The data may then be reconstructed using the extracted parameters.

The method embodiment 2 further contemplates accommodating lost packets. In particular, if it is determined that one of the packets from a sequence has been lost (block 26), the low correlation parameters may be obtained from the other packet in the sequence as this data has been placed in each packet. In particular, the low correlation parameter for the lost packet may be obtained from the other packet in the sequence (block 32), and the high inter frame correlation parameter reconstructed using at least the high correlation parameter from the other packet in the sequence (block 34). More preferably, a plurality of high correlation parameters are used to reconstruct the lost parameter.

Figure 4B:
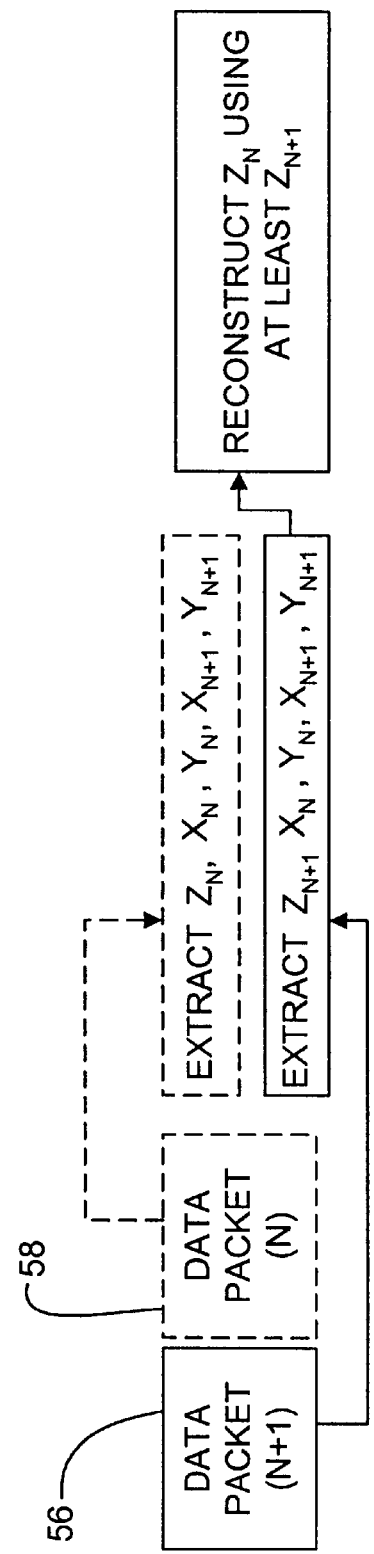

With reference to the schematic of FIG. 4(b) by way of example, the X and Y parameters are obtained from the frame 56 when frame 58 is determined to be lost. The high inter frame correlation parameter is of course not available from the other frame in the sequence. Because it is of a high inter frame correlation, however, it may be reconstructed using high inter frame correlations from at least one other packet. The schematic of FIG. 4(b), for example, illustrates a step of reconstructing the lost parameter $Z_N$ for the lost packet 58 using at least the parameter $Z_{N+1}$ from the packet 56. It is noted that other invention embodiments may comprise reconstructing the high inter frame correlation parameter using parameters from a plurality of other packets, with packets adjacent to the lost packet preferred.

With this general invention having been now discussed, a more detailed embodiment may be illustrated. In particular, it has been discovered that embodiments of the invention are of particular utility when directed to speech coding methods, and more particularly to use with linear predictor coders ("LPC"). For example, an invention embodiment comprises steps of multiple description coding in combination with a code excited linear predictor ("CELP") method. Before describing this embodiment in detail, basic operation of a CELP coder, in the form of the FS CELP coder, will be helpful.

Figure 5:
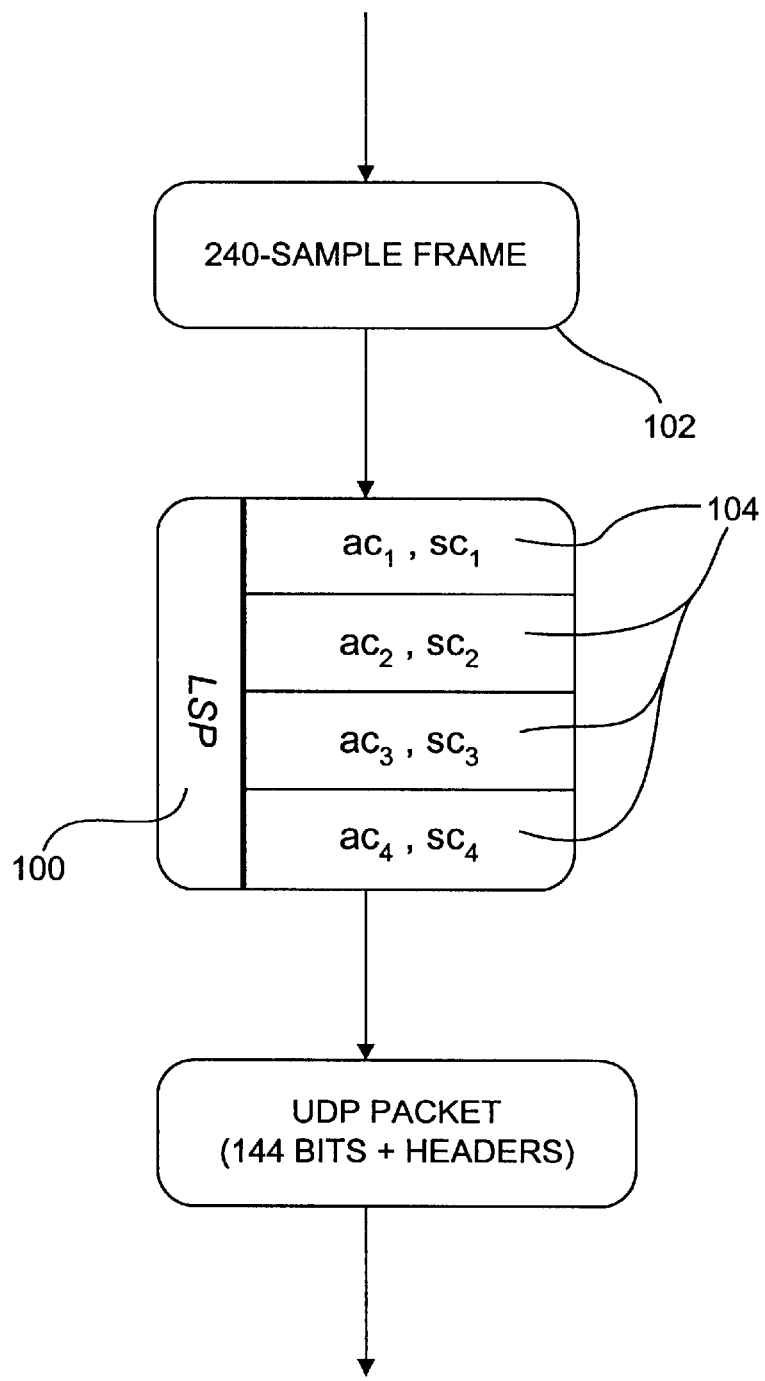
FIG. 5 is a schematic illustrating a FS CELP coder of the prior art.

FIG. 5 is a schematic useful for describing a FS CELP single description coder ("SDC") operation of the prior art. In the original SDC FS CELP coder, a 34-bit line spectral pair ("LSP") vector parameter 100 describes each 240-sample speech frame 102. The 240 sample frame is further divided into four sub-frames 104 of 60 samples each, with excitation parameters in the form of adaptive and stochastic codewords (with 110 bits total), ac and sc, respectively, used to describe each of the sub-frames 104. The frame parameters totaling 144-bits are encapsulated in a UDP packet and sent to the receiver over a network.

The single-description CELP decoding process is generally the reverse process as that illustrated by FIG. 5. In general, the packets are received, and the LSP vector parameters and the adaptive and stochastic codewords are extracted and used to generate speech. If communication occurs over a lossy network and one or more consecutive packets are lost, the receiver may not be able to recover the parameters in the corresponding coded frames and will play silence in the decoded speech frames. When valid packets are received once again, the receiver will extract the parameters and feed them to the CELP decoder. Since decoding is state dependent, there will be several frame delays before the proper states of the decoder are restored and satisfactory playback quality is achieved. As a result, the performance of an SDC CELP coder is very sensitive to packet losses and burst lengths.

With this general description of SDC operation for the CELP coder, an embodiment of the present invention that comprises two-way MDC CELP may be illustrated. With reference to the schematic of FIG. 6, an embodiment of the present invention comprises a step of dividing input data into a plurality of frames 102 and 104. In this invention embodiment, each frame comprises 240 speech samples. The CELP coder 106 comprises a coder modified to perform steps of the invention embodiment in addition to general steps of CELP coding, such as generation of LSPs, and adaptive and stochastic codewords. The modified CELP coder 106 codes each pair of 240-sample frames in the original speech sequence to generate an LSP vector for each frame, as well as an adaptive and stochastic codeword set for each sub frame of size 120 samples, as represented by the box 108.

The modified CELP multi-description coder 106 then places all of the adaptive and stochastic codewords from each of the sub-frames into two description streams 110 and 112. The LSP parameters, however, are interleaved into the two description streams 110 and 112 so that the $LSP_0$ parameter vector is placed in the stream 110 and the $LSP_1$ parameter vector is placed in the stream 112.

It has been discovered that interleaving LSP parameters in LP speech processors in this manner is an advantageous step for error concealment resulting from packet loss because a missing LSP parameter vector may be relatively accurately reconstructed. The difference between LSP parameters for adjacent frames or sub-frames is closely related to the formant bandwidths of speech, which suffice to specify the entire spectral envelope for vowels. This close relationship suggests that linear interpolations of LSPs, which are equivalent to the interpolation of the difference of adjacent LSPs, are closely related to the generation of smooth format information.

It has been discovered that LSPs in LP speech coding change slowly from one frame to the next and thus have high inter-frame correlations. Those skilled in the art will appreciate that there are many methods known for evaluating correlations of variables between samples. As used herein, the term "high correlation" is intended to broadly refer to a condition of relative smoothness and constant change between sequential parameters. In statistics, the correlation between two sequences $X=\{x_1, \ldots, x_n\}$ and $Y=\{y_1, \ldots, y_n\}$ may be represented as:

$$C = \frac{E(X - \mu_x)(Y - \mu_y)}{\sqrt{\text{Var}(X)\text{Var}(Y)}}$$

where $\mu_I$ and Var(I) are the mean and variance of sequence I, and C is a correlation coefficient. Those skilled in the art will appreciate that many other methods for calculating a correlation are known and suitable for practice with the present invention.

Invention embodiments have been found to perform well when the correlation coefficient of LSP parameters using a linear predictor coder and multiple individual input speech patterns achieves:

TABLE 1

LSP Correlation Factors

| Parameter Distance | Correlation Coefficient C | More Preferred Correlation Coefficient C |
|---|---|---|
| 1 | $|C| >$ about 0.6 | $|C| >$ about 0.7 |
| 2 | $|C| >$ about 0.4 | $|C| >$ about 0.6 |
| 3 | $|C| >$ about 0.3 | $|C| >$ about 0.4 |

It will be noted in reference to Table 1 that "Parameter Distance" refers to the sequential distance between parameters. Further, the term "parameter" as used herein is intended to be broadly interpreted as encompassing a plurality or a set of parameters as well as a single parameter. Accordingly, "parameter distance" may refer, for example, to distances between sets of parameters, parameter vectors, or to distances between frames (as is the case when considering LSPs), or to distances between parameters within a frame.

The results illustrated by Table 1 suggest that an LSP from one or more lost packets can be accurately reconstructed from those received in adjacent/proximate packets using relatively straightforward methods such as linear interpolation and sign changes. Also, the vector of LSP indices in a frame is monotonically increasing ($0<X_1<X_2<\ldots<X_{10}$). This means that it is equivalent to a stable linear predictor, and that a vector of interpolated LSPs will also be a stable linear predictor when using linear interpolations to reconstruct lost LSPs.

Accordingly, linear interpolation of LSPs has been discovered to be accurate for approximating the positive correlation and smooth changing of LSPs, and has accordingly been discovered to be a useful method step for concealing packet losses. Further, the interleaving of LSPs is thus an acceptable practice for LP coding in that the loss of one or more LSPs may be overcome through reconstruction.

The excitation parameters in the form of the adaptive and stochastic codewords, however, have been discovered to be not well correlated from frame to frame. Accordingly, they will not be able to be well reconstructed when lost. Thus these parameters are placed in both description streams 110 and 112.

It will be appreciated that other invention embodiments may be practiced using other discovered correlation relationships than inter or intra frame correlations. Indeed, virtually any pattern of correlation, once discovered, can be manipulated through an invention embodiment to achieve multiple descriptions through interleaving.

Figure 6:
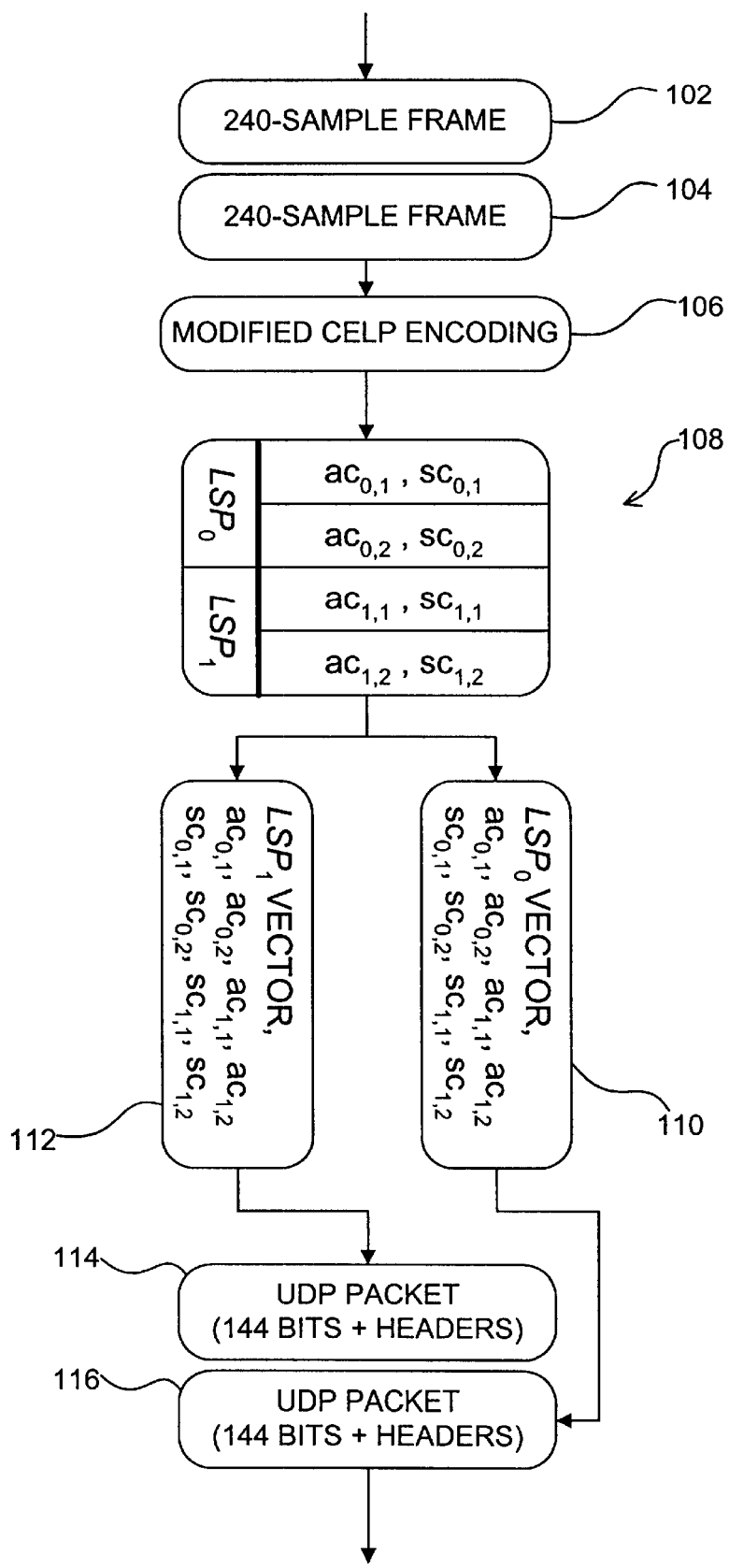
FIG. 6 is a schematic illustrating a 2 description MDC CELP coder embodiment of the present invention.

The MDC CELP coder based embodiment of the invention described in FIG. 6 differs from the standard SDC CELP coder in the size of sub-frames used for modeling with adaptive and stochastic codewords. This is done so that the bit rate of transmission remains constant with the original CELP coder of the prior art, and accordingly so that increased bandwidth is not required for practice of this method embodiment.

In particular, the modified CELP coder 106 doubles the prior art sub-frame size of 60 samples to 120 samples, and then generates a total of 110-bit codewords for the four 120-sample sub-frames. This allows the frame size in each description to be 144 bits, the same size as a coded frame in SDC CELP of the prior art. Thus the modified CELP coder 106 models sub-frame sizes of twice the size of the SDC CELP coder, resulting in some quality degradation. Experiments have shown, however, that the degradation in quality is acceptable, and thus represents a worthwhile tradeoff for the loss concealment capabilities resulting form the interleaved descriptions.

After coding and parameter interleaving, each of the description streams 110 and 112 has an LSP parameter vector that describes one of the frames 102 and 104, and adaptive and stochastic codewords that describe both of the frames 102 and 104. Each frame of these description streams 110 and 112 is then encapsulated in an individual UDP packet 114 or 116. By way of example, the description stream frame 110 is placed in the UDP packet 116, while the description stream frame 112 is placed in the UDP packet 114. The sequence of packets 114 and 116 is maintained in sending the packets to the network. Note that the invention embodiment has maintained the same frame size of 240 in linear prediction analysis, while providing multiple descriptions of the samples.

At the receiver side, if all the packets in both descriptions are received, the receiver carries out the reverse process generally illustrated in FIG. 6. It first de-interleaves the information received into a single coded stream by extracting the LSPs from frames in both descriptions and the codewords from frames in either description, before decoding the coded stream. It is noted that the quality of the decoded stream is equivalent to a coder with a frame size of 240 and a sub-frame size of 120. The precision of linear prediction analysis has been preserved, however, so the decoded stream can be guaranteed to have better quality than sample-based MDC.

When some packets in one description are lost, the receiver only needs to reconstruct the lost LSPs using the LSPs in those packets received in the other description. It does not reconstruct the codewords because they are replicated in both descriptions. For example, if a frame from the description 110 of FIG. 6 is lost, then the receiver reconstructs the LSPs in the lost frame by averaging the LSPs of the immediately preceding and following frames in the description 112. It is easy to see that such reconstructions based on averaging result in stable linear predictors. Moreover, since the receiver reconstructs the coding parameters of lost frames before decoding, it does not need to estimate the decoding states of lost frames as is done in SDC.

When the loss of a burst of packets leads to the loss of all the frames corresponding to those of an interleaving set, the receiver may not be able to reconstruct the lost LSPs and codewords with required accuracy, and may have to resort to other concealment methods such as, for instance, generating silence in the decoded speech sequence. However, the chance for such bursty losses is much smaller than that in SDC because all losses of burst length one and some losses of burst lengths two can be recovered using the method embodiment as illustrated in FIG. 6.

Other embodiments of the present invention will comprise steps of using a degree of replication greater than 2. By way of example, invention embodiments may comprise MDC LSP coding using 3, 4, 5, or more description streams. By way of more particular example, the schematic of FIG. 7 is presented to illustrate a four-way LSP-based MDC CELP method embodiment.

Figure 7:
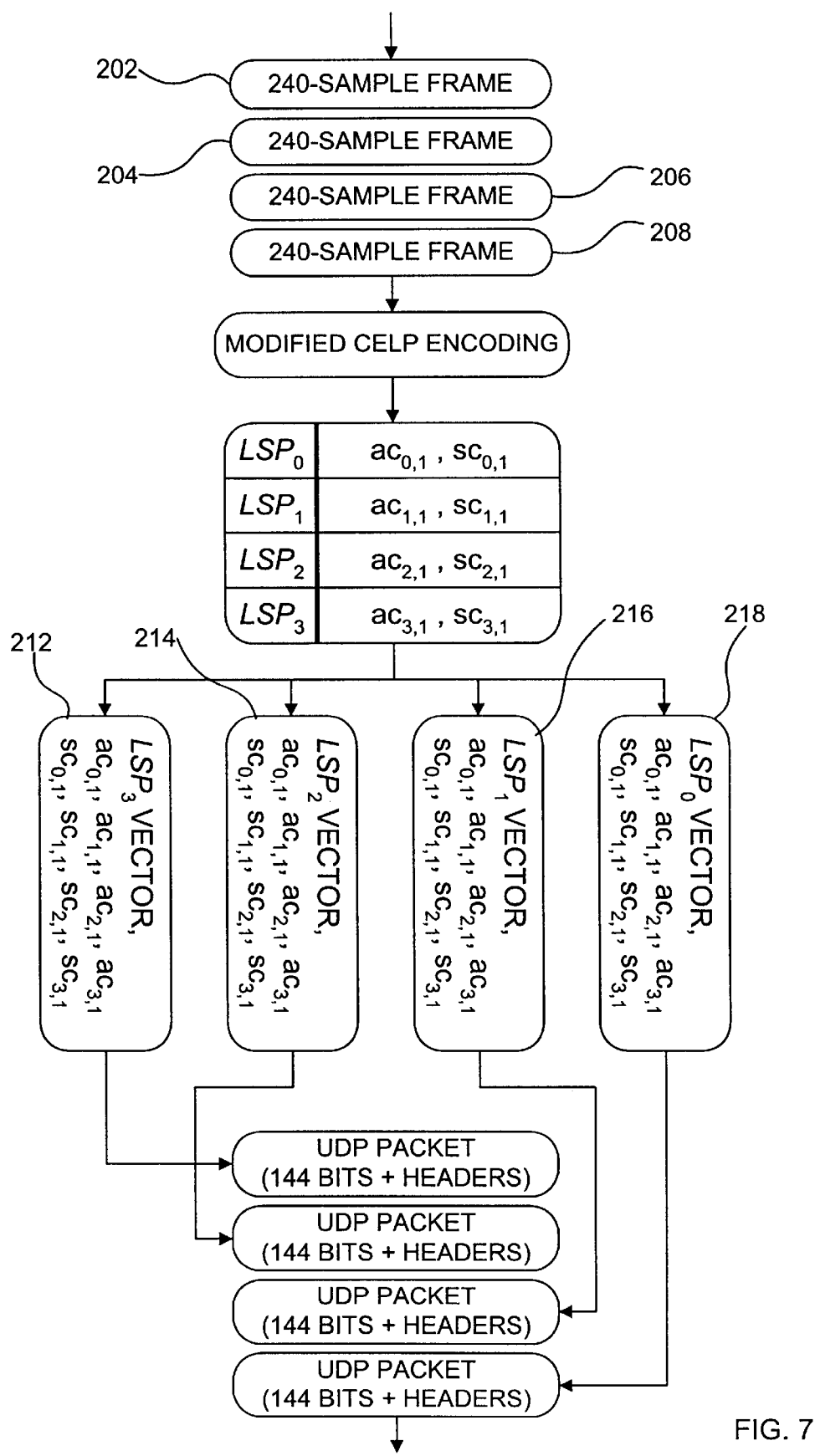
FIG. 7 is a schematic illustrating a 4 description MDC CELP coder embodiment of the present invention.

FIG. 7 shows the way that the sender interleaves the LSPs of four 240-sample frames in an interleaved set into four frames in the four descriptions. Here, the frame size of frames 202–208 in linear prediction analysis remains at 240 samples, but the sub-frame size has been increased to 240 samples (from 60 samples in the SDC CELP coder of the prior art) in order to maintain the same 144-bit description frame size of description frames 212–218 after the adaptive and stochastic codewords are replicated in each description and the LSPs are interleaved. After coding and parameter interleaving, the description i, i=0,1,2,3, contains the LSPs of frame 4n+i and the codewords from all the coded frames. Note that the quality of four-way MDC is expected to be worse than that of two-way MDC due to its longer sub-frame size.

In four-way MDC, there are five loss patterns of frames in an interleaving set in which losses can be concealed at the receiver: one out of four frames received (0, 1, 2, or 3), two consecutive frames received (0–1, 1–2, 2–3, or 3-0), two disjoint frames received (0–2, or 1–3), three frames received (0–1-2, or 1–2-3, or 2–3-0, or 3-0-1), and all four frames received. If four frames are received, then the receiver de-interleaves the parameters before decoding. In all the other cases, the receiver can recover a lost LSP(s) by interpolating the LSPs received in immediately preceding and following frames. Similar to two-way MDC, linear interpolations result in stable linear predictors in 4-way MDC.

The selection of a degree of replication may be based on the degree of "burstiness" of packet loss experienced on the packet switched network used for communication. It has been discovered that the Internet has a high preponderance of one or two burst losses for communications carried out in the United States. Accordingly, a degree of replication of 2 (i.e., two descriptions) is suggested to be suitable for intra-US Internet communications. Some international Internet communications have been discovered to have a substantial occurrence of loss bursts greater than 2, however, so a degree of replication of 3 or 4 may be preferred. It is suggested that for most Internet based LP voice coding operations, a degree of replication of 4 will be the maximum that is required.

Other invention embodiments may comprise determining dynamically the packet loss burst length behavior of the network being used, and using this information to set the degree of replication. By way of example, an invention embodiment may comprise a step of sending periodically one or more "ping" signals to the receiver to determine the packet loss burst size distribution, and setting the degree of replication accordingly. Other invention embodiments may comprise a feedback-based selection whereby the receiver may indicate periodically that the quality of the received signal is low, and that the degree of replication accordingly should be increased.

Those knowledgeable in the art will appreciate that the present invention lends itself well to practice in the form of computer program products. Accordingly, additional embodiments of the invention may comprise computer program products comprising computer executable instructions stored on a computer readable medium that when executed by a computer cause the computer to perform steps of a method embodiment of the invention. It will thus be appreciated that description of invention method embodiments made herein may also be considered to be description of a computer program product invention embodiment in that the method steps may be performed by a computer.

Further, the term "computer" as used herein is intended to broadly refer to any device capable of executing instructions, with examples including, but not limited to, desktop computers, servers, portable computer devices, portable processor based communications devices such as a cellular phone or a personal digital assistant, other portable processor based devices, and the like. Examples of computer readable mediums suitable for use with practice of invention embodiments include, but are not limited to, optical storage mediums, magnetic storage mediums, dynamic and static memory mediums, and the like.

Those knowledgeable in the art will appreciate that the invention embodiments discussed herein are presented only to illustrate the best known modes of practice of the present invention, and that many additional embodiments are possible. Indeed, modifications to the invention embodiments discussed herein will be obvious to those knowledgeable in the art. By way of example, the sequence of method steps as discussed herein may be altered within the scope of the invention. In addition, steps of using descriptions may be eliminated, with parameters instead simply placed directly in data packets.

Also, other linear predictor coders may be used with methods of the invention in addition to the CELP coder described herein. By way of example and not limitation, those knowledgeable in the art will appreciate that embodiments of the present invention may be practiced using MELP, MP-MLQ, and ACELP speech coders. It will be further appreciated that when practicing the invention with any of these speech coders, it may be desirable to decrease the parameter to sample ratio for replicated parameters in order to maintain the bit rate of the original coder while practicing MDC. That is, the number of samples described per parameter for replicated parameters may be decreased by a factor equal to the degree of replication so that the bit rate of the coder with multi description coding is consistent with the bit rate when using SDC.

By way of still additional example, although method of embodiments have been discussed in relation to communicating voice data, it will be appreciated that the present invention will be useful for communicating a wide variety of data, including, but not limited to, images, video, music, and that like. Methods of the present invention may prove of particular utility with wireless networks, as it may be more difficult to provide a high degree of reliability for a wireless than for a land based network.

Also, it will be appreciated that one invention embodiment may comprise steps of coding and interleaving parameters only, and, while a second embodiment may comprise additional steps of communicating the data over a network, and receiving, de-interleaving, and decoding the data. It is intended that the specific embodiments and configurations herein disclosed are illustrative of the preferred and best modes for practicing the invention, and should not be interpreted as limitations on the scope of the invention as defined by the appended claims.

What is claimed is:

1. A method for organizing data into packets comprising the steps of:
    dividing the data into a plurality of frames, each of said frames being described by at least a first and a second parameter, said second parameter having a high correlation between sequential ones of said second parameters;
    replicating said first parameter by placing said first parameters for each of said plurality of frames in at least a first and a second data packet whereby each of said first and second data packets include said first parameter; and,
    interleaving said second parameters for said plurality of frames into said first and second data packets whereby a second parameter describing a first of said plurality of frames is placed in said first data packet and a second parameter describing a second of said frames is placed in said second data packet.

2. A method as defined by claim 1 wherein the method further comprises the steps of:
    communicating said plurality of data packets over a packet switched network;
    receiving said plurality of data packets communicated over the packet switched network;
    decoding said data by extracting said first parameters from one of said first or second data packets, and extracting said interleaved second parameters from each of said first and second data packets; and,
    identifying at least one lost packet from said plurality of data packets, obtaining a replacement first parameter for said lost packet from another of said packets, and reconstructing said second parameter from for said lost packet using at least a second parameter from a packet adjacent to said lost packet.

3. A method as defined by claim 2 wherein the step of reconstructing said second parameter for said lost packet comprises using an additional second parameter from an additional packet adjacent to said lost packet.

4. A method as defined by claim 3 wherein the step of reconstructing said second parameter further comprises performing an interpolation.

5. A method as defined by claim 2 wherein said network is wireless.

6. A method as defined by claim 1 wherein said plurality of frames comprises at least 4 frames, and wherein the method further comprises steps of:
    placing said first parameters for each of said frames into a third data packet and into a fourth data packet from said plurality of data packets; and,
    interleaving said second parameters for said frames into said first, second, third, and fourth data packets whereby one of said second parameters for each frame of a sequence of four of said frames are placed in different of said first, second, third, and fourth data packets.

7. A method as defined by claim 6 further comprising the steps of:
    communicating said plurality of data packets over a packet switched network;
    receiving said data packets communicated over the packet switched network;
    decoding said data by extracting said first parameters from one of said first, second, third, or fourth data packets, extracting said interleaved second parameters from each of said first, second, third, and fourth data packets; and,
    identifying at least a burst of two lost packets from said plurality of data packets, retrieving a replacement first parameter for said lost packets from one of the remaining of said first, second, third, or fourth data packets, and reconstructing said second parameter for said lost packet using said second parameter from a prior adjacent packet to said lost packets and a subsequent adjacent packet to said lost packets.

8. A method as defined by claim 7 wherein the step of reconstructing said second parameter for said lost packet comprises performing an interpolation.

9. A method as defined by claim 1 wherein said second parameter comprises a plurality of parameters.

10. A method as defined by claim 1 wherein said first parameter comprises a plurality of first parameters.

11. A method as defined by claim 1 wherein the method further comprises the step of determining an intra-frame correlation and an inter frame correlation for said first and second parameters, said second parameter having one of a high inter-frame or intra-frame correlation.

12. A method as defined by claim 1 wherein the method further comprises coding input data with a linear predictor coder, said first and second parameters comprising linear predictor coder parameters.

13. A method as defined by claim 12, wherein the data comprises input samples, each of said frames having a number of samples, wherein said linear predictor coder operates at a particular bit rate and use a particular number of parameters to describe a particular number of samples, and wherein the method further comprises the step of doubling the particular number of samples described by said first parameters to maintain said particular bit rate.

14. A method as defined by claim 13 wherein said first parameter comprises an excitation parameter and said second parameter comprises a line spectral pair parameter.

15. A method as defined by claim 1 wherein the method further comprises the step of detecting a loss index for the packet network and increasing the number of description streams to a number greater than 2 if said loss index is relatively high, and decreasing said number of description streams to two if said loss index is relatively low.

16. A method as defined by claim 1 wherein said second parameter has a correlation coefficient having an absolute value of at least about 0.6 from parameter to parameter, of at least about 0.4 for a distance of two parameters, and of at least about 0.3 for a distance of 3 parameters.

17. A method as defined by claim 1 wherein each of said packets contains a plurality of parameters describing more than one of said frames.

18. A method as defined by claim 1 wherein the step of dividing the data into a plurality of frames comprises dividing the data into a plurality of frame sequences, each of said sequences comprising a plurality of frames, and wherein the step of sequentially encapsulating said first and second descriptions into a plurality of data packets comprises encapsulating said first and second descriptions into a plurality of reoccurring sequences of data packets, whereby a first data packet in each of said packet sequences contains parameters from said first description and a second data packet in said packet sequences contains parameters from said second description.

19. A method as defined by claim 1 further comprising the step of placing said first parameters in each of a first and a second description, and of interleaving said second parameters in said first and second descriptions whereby one of said second parameters is in said first description and the subsequent of said second parameters is in said second description, and wherein said descriptions are sequentially encapsulated in said plurality of data packets whereby said first data packet contains parameters from said first description and wherein said second data packet contains parameters from said second description.

20. A method for communicating voice data over a packet switched network, the method comprising the steps of:
obtaining data samples of an input voice stream;
dividing said data samples into a plurality of sequences of frames, each of said sequences comprising a plurality of frames, each of said frames representing a plurality of said samples;
modeling each of said frames using a linear predictor coder, said linear predictor coder determining at least an excitation parameter and a line spectral pair parameter for each of said frames;
placing said excitation parameter for each of said plurality of frames from each of said sequences in at least a first and a second description stream;
interleaving said line spectral pair parameters for each sequential of said frames from each of said sequences into said at least a first and a second description streams whereby a line spectral pair parameter describing a first of said plurality of sequential frames in each of said sequences is placed in said first description stream and a line spectral pair describing the next sequential frame is placed in said second description stream;
encapsulating said line spectral pair parameters and said excitation parameters from said at least a first and a second description streams into a plurality of reoccurring packet sequences whereby a first packet from each of said reoccurring packet sequences contains parameters from said first description stream and a second packet from said reoccurring packet sequences contains parameters from said second description stream; and,
communicating said plurality of reoccurring packet sequences of data packets over the packet switched network.

21. A method as defined by claim 20 wherein the method further comprises the steps of:
receiving said reoccurring plurality of packet sequences communicated over the packet switched network;
recreating said excitation parameters and said line spectral pair parameters by extracting said excitation parameters from one and only one of said first or said second packets from each of said reoccurring sequences of data packets, and extracting said interleaved line spectral pair parameter from each of said first and said second data packets in each of said reoccurring sequences of data packets;
identifying at least one lost first or second packet from one of said reoccurring sequences of data packets, obtaining a replacement excitation parameter for said lost packet using said excitation parameter from the other of said first or second packets from said reoccurring sequences, and reconstructing said line spectral pair parameter for said lost packet through an interpolation using line spectral pair parameters from packets adjacent to said at least one lost and packet; and,
decoding said data samples of said input voice stream using said excitation parameters and said line spectral pair parameters.

22. A computer program product for organizing data into packets, the program product comprising computer executable instructions stored in a computer readable medium that when executed by a computer cause the computer to:
divide input data into a plurality of frame sequences, each of said sequences comprising i sequential frames, modeling each of said i frames with a model that uses at least a first and a second parameter, said first parameter having a low inter-frame correlation and said second parameter having a high inter-frame correlation;
place said first parameters for each of said i frames from each of said frame sequences in one of a reoccurring data packet sequence, each of said packet sequences comprising i packets, whereby said first parameters from each of said i frames from one of said frame sequences is placed in each of said i packets in a respective packet sequence;
interleave said second parameters for each of said i frames from each of said sequences into said reoccurring data packet sequences whereby a second parameter describing each of said i frames from said one of said frame sequences is placed in a different of said i data packets in said respective packet sequence; and,
wherein i is an integer equal to or greater than 2.

23. A computer program product as defined by claim 22, wherein the program instructions when executed further cause the computer to:
communicate said plurality of packet sequences over a packet switched network;
receive said sequences of data packets communicated over the packet switched network;
extract said first parameters from one and only one of said i packets in each of said sequences of packets and extract said interleaved second parameters from each of said i packets from said sequences; and,
identify at least one lost packet from one of said packet sequences, obtain a replacement first parameter for said lost packet from another of said i packets in said packet sequence, and reconstruct said second parameter for said lost packet through an interpolation based on second parameters obtained from packets adjacent to said lost packet in said packet sequence.

24. A computer program product as defined by claim 23 wherein i is an integer greater than 3 and less than 9, and wherein said at least one lost packet comprises a burst of at least 3 sequential lost packets.

25. A computer program product as defined by claim 22 wherein said input data comprises voice data, and wherein said program product further causes the computer to code said input voice data with a linear predictor coder, and wherein said first parameter comprises an excitation parameter and said second parameter comprises a line spectral pair parameter.

26. A computer program product as in claim 25 wherein said linear predictor coder operates at a particular bit rate, and uses a particular number of parameters to describe a particular number of samples, and wherein the computer program product further causes the computer to increase said particular number of samples described by said first parameters by a factor of i whereby said particular bit rate is maintained.

27. A computer program product as defined by claim 25 wherein said first parameter comprises a plurality of parameters, said plurality comprising at least adaptive codeword parameters and stochastic codeword parameters.

28. A computer program product as defined by claim 22 wherein said second parameter has a correlation coefficient having an absolute value of at least about 0.6 from parameter to parameter, of at least about 0.4 for a distance of two parameters, and of at least about 0.3 for a distance of 3 parameters.

29. A computer program product as defined by claim 22 wherein the program product further causes the computer to:

place said first parameters from each of said i frames in each of said frame sequences in each of i descriptions;

interleave said second parameters from each of said i frames from each of said frame sequences in said i descriptions whereby said second parameter from each of said i frames is placed in a different of said i descriptions; and, wherein said first and second descriptions are encapsulated in said data packet sequences whereby each of said i packets in each of said reoccurring sequences contains parameters from different of said i descriptions.

30. A computer program product for organizing voice data into packets, the program product comprising computer executable instructions stored in a computer readable medium that when executed cause the computer to:

obtain data samples of an input voice stream;

divide said data samples into a plurality of sequences of frames, each of said sequences comprising a plurality of frames, each of said frames representing a plurality of said samples;

model each of said frames using a linear predictor coder, said linear predictor coder determining at least an excitation parameter and a line spectral pair parameter to model each of said frames;

place said excitation parameter for each of said plurality of frames from each of said sequences in at least a first and a second description stream;

interleave said line spectral pair parameters for sequential of said frames from each of said sequences into said at least a first and a second description stream whereby a line spectral pair parameter describing a first of said plurality of sequential frames in each of said sequences is placed in said first description stream and a line spectral pair describing the next sequential frame is placed in said second description stream; and, encapsulate said parameters from said at least a first and a second description streams into a plurality of reoccurring packet sequences whereby a first packet from each of said reoccurring packet sequences contains parameters from said first description stream and a second packet from said reoccurring packet sequences contains parameters from said second description stream.

31. A computer program product as defined by claim 30, wherein the program instructions when executed further cause the computer to:

communicate said plurality of packet sequences over a packet switched network;

receive said plurality of data packet sequences communicated over the packet switched network;

decode said data samples by using said excitation parameters extracted from one and only one of said packets in each of said sequences of packets and said interleaved line spectral pair parameters extracted from each of said packets from said sequences; and identify at least one lost packet from one of said packet sequences, obtain a replacement excitation parameter for said lost packet from another of said packets in said packet sequence, and reconstruct said line spectral pair parameter from said lost packet through an interpolation based on line spectral pair parameters obtained from packets adjacent to said lost packet in said packet sequence.

32. A method for organizing data into packets as defined by claim 1 and further including the step of determining said first and second parameters for each of said frames by applying a model to said data in each of said frames.

* * * * *

UNITED STATES PATENT AND TRADEMARK OFFICE
CERTIFICATE OF CORRECTION

PATENT NO. : 6,754,203 B2  
DATED : June 22, 2004  
INVENTOR(S) : Wah et al.

It is certified that error appears in the above-identified patent and that said Letters Patent is hereby corrected as shown below:

<u>Column 11,</u>  
Line 36, delete the word "from".

Signed and Sealed this

Eleventh Day of January, 2005

JON W. DUDAS  
*Director of the United States Patent and Trademark Office*